(12) United States Patent
Oshima

(10) Patent No.: US 6,961,090 B2
(45) Date of Patent: Nov. 1, 2005

(54) TWO ZONE AUTOMATIC LENS FOCUSING SYSTEM FOR DIGITAL STILL CAMERAS

(75) Inventor: Shigeru Oshima, Tokyo (JP)

(73) Assignee: ARC Design, Inc., Tokyo (JP)

( * ) Notice: Subject to any disclaimer, the term of this patent is extended or adjusted under 35 U.S.C. 154(b) by 593 days.

(21) Appl. No.: 09/880,655

(22) Filed: Jun. 13, 2001

(65) Prior Publication Data

US 2002/0191098 A1 Dec. 19, 2002

(30) Foreign Application Priority Data

Jun. 6, 2001 (CN) .......................................... 90113711 A

(51) Int. Cl.$^7$ ........................ H04N 5/225; G03B 17/00; G03B 13/34
(52) U.S. Cl. ........................ 348/335; 396/439; 396/133
(58) Field of Search .............................. 396/103, 111, 396/131, 133–136, 144, 529–533, 439, 79–83; 348/345, 335, 373–376; 310/14

(56) References Cited

U.S. PATENT DOCUMENTS

| | | | | |
|---|---|---|---|---|
| 4,148,574 A | * | 4/1979 | Johnson ...................... | 396/105 |
| 4,910,547 A | * | 3/1990 | Mima et al. ................. | 396/121 |
| 4,920,420 A | * | 4/1990 | Sano et al. .................. | 348/351 |

FOREIGN PATENT DOCUMENTS

| | | | | |
|---|---|---|---|---|
| GB | 2259576 A | * | 3/1993 | ........... G03B/17/04 |

* cited by examiner

Primary Examiner—Wendy R. Garber
Assistant Examiner—Timothy J. Hen

(57) ABSTRACT

A two zone lens auto-focusing system to be used in a digital still camera includes a picture taking lens, a solenoid to switch the lens focus point between near distance point and far distance point. The CPU or the electronically controlled distance measuring system of the camera having detected the position of the object, it excites the solenoid, and the head of the solenoid is pulled into the solenoid body with a very short stroke, and the arm that is provided on the lens barrel and coupled with the solenoid head is also pulled toward the solenoid body to transfer the movement of solenoid head to the lens barrel, so that the lens focus may be set at either of far position or near position automatically. These members are assembled and form a simple two zone auto-focusing system of digital still cameras.

4 Claims, 3 Drawing Sheets

TWO ZONE AUTOMATIC LENS FOCUSING SYSTEM FOR DIGITAL STILL CAMERAS

BACKGROUND OF THE INVENTION

1. Field of the Invention

This invention relates to the lens auto-focusing system of a digital still camera, which automatically switches the lens focusing point between two zones, namely from near zone to far zone or reverse way according to the signals of the distance judgments made by and sent from the CPU or electronically controlled distance measuring system of the camera.

2. Background Art

In the conventional auto-focusing of digital still cameras, the lens is focused at the object by checking the image formed on the image sensor like CCD sensor or C-MOS sensor that is controlled by the CPU (Central Processing Unit) provided in the camera. First the lens starts moving from its home position (standing position) and moves back and forth, and while the lens is moving, frequently the CPU checks the image formed on the image sensor like CCD or C-MOS through the lens, and then the lens stops at the position where the image becomes most sharply in focus. In this case the lens must be driven back and forth in straight succession along the ring cam, which is provided with the lens driving mechanism and is rotated by a stepping motor so that the lens may move back and forth when the stepping motor is rotating. While the lens moves back and forth, the CPU detects the moment when the image becomes most sharply in focus, and at that moment of the best image detected the CPU sends a signal to the lens to stop moving. Then the lens stops at that position, where the image is in best focus. After capturing a picture, the lens must return to its home position (standing position), and to return the lens to the home position the ring cam starts rotation again. When the lens comes back to the home position, the photo-interrupter provided beside the lens barrel detects the home position of the lens with a kind of shutter provided on the rim of the lens barrel, which shuts the light of the penetrating type photo-interrupter. And the moment when the photo-interrupter detects the home position, the lens moving stops at that position, namely at the home position.

Thus in the ordinary case of auto-focusing system of digital still cameras, the lens must be driven in straight succession, and the image detection must be done in frequent succession, and the lens must be returned to its home position each time after capturing a picture. These steps of automatic focus setting of the lens take time and in many cases miss the best picture capturing chances. Further more the mechanism that consists of a stepping motor, a ring cam and a photo-interrupter is rather expensive in cost.

FIGS. 1 and 2 show a typical conventional auto-focusing system for achieving the heretofore explained functions. When the stepping motor (1) receives a signal to start from the CPU of the camera, the stepping motor starts rotating and the stepping motor gears (2) that are engaged with the ring cam gear (3) provided on the rim of ring cam (4) starts rotating. Then the ring cam (4) starts rotating with its ring cam gear (3) engaged with the stepping motor gears (2), and the position sensing rod (5) starts moving back and forth (up and down) along the aslope surface of ring cam (4), then the whole lens assembly (6) starts moving back and forth along the guide rail (7) which is provided with the lens assembly (6). The one side of the lens barrel is shaped like a sleeve, and on the sleeve the position-sensing rod (5) is provided as a part of the sleeve protruding from the sleeve, and on the outermost part of the sleeve of the lens assembly (6) the axle bearing part (8) is provided, which moves along the guide rail (7) back and forth. On the other side of the lens barrel there the position-stabilizing fork (9) is formed as a part of the lens barrel, and between the ends of the fork (slot) the position-stabilizing pin (10) is provided.

The axle bearing part (8) and the guide rail (7) support the whole lens assembly (6) together with the position-stabilizing fork (9) and position-stabilizing pin (10). The lens assembly (6) is pressed always toward the image sensor (I 1) by the coil spring (I 2) so that the tip of position sensing rod (5) always touches the aslope surface of the ring cam (4) properly without fail.

While the power switch of the digital still camera is on, an image is formed on the image sensor (11) through the lens. The instant that the switch of auto-focusing system is turned on, the focusing status of the image is to be sent to the CPU to check the image formed on the image sensor in frequent succession, and the instant that the image comes to the sharpest status in focus, the CPU gives a signal to stop the checking, namely to get the stepping motor (1) to stop. Then the shutter can be released and the image is captured. After these steps, the lens assembly (6) must be returned to its home position (standing position). On the rim of the ring cam (4), the position sensing shutter-blade (13) is provided. After capturing a picture, the ring cam (4) starts rotating again to return the lens assembly (6) to its home position, and when the position-sensing shutter-blade (13) comes into the slot of photo-interrupter (14), the light (beam) of the photo-interrupter (14) is shut off by the position-sensing shutter-blade (13), and the ring cam (4) stops at once there, so that the lens assembly (6) may return and stop at its home position. The FIG. 2 shows the lens assembly being at its home position.

As explained in this example, it is necessary for the lens assembly (6) to move back and forth continuously to let the CPU check the image status. Such searching of the best focusing point by repeating image checking with mechanical and continuous lens movement takes time inevitably, and may cause users to miss good shutter chances. Further more the mechanism itself is rather complicated, and must be delicately adjusted, and assembling of the mechanism is difficult. The parts and components used in the mechanism are rather expensive. So it is preferable to have a much simpler mechanism with much less and inexpensive parts and components, and with much less processing time for autofocusing.

SUMMARY OF THE INVENTION

It is, therefore, an object of the present invention to provide an autofocusing system of digital cameras, which makes it possible to shorten the total processing time of autofocusing.

It is another object of the present invention to provide an autofocusing system of digital cameras, of which mechanism is simplified using as much less expensive and less number of parts and components as possible.

In this invention, the two-zone autofocusing system is constructed as described hereinafter to shorten the total autofocusing processing time and to replace the expensive parts and components with inexpensive and less number of them to save space and cost.

The two zone autofocusing system of this invention (hereinafter referred to as the 2 zone AF system for simplicity) comprises a picture taking lens, a solenoid, a lens position stabilizing mean and a guide rail. In this invention, differently from the system shown in FIGS. 1 and 2, an inexpensive solenoid is used replacing the expensive stepping motor, the delicately formed ring cam with gear is omitted, the expensive photo-interrupter is omitted, and in general the construction and mechanism are much simpler and easier to be assembled in comparison with the system shown in FIGS. 1 and 2.

The 2 zone AF system of this invention is based on very deep focal depth of field, very small size, very light weight and very short focusing stroke of digital camera lenses. Quite differently from conventional still cameras like 35 mm format ones, the lenses of digital cameras have much shorter focal length. In many cases, those are between 4 mm and 15 mm. Theoretically the shorter the focal length is the deeper the focal depth of filed is.

For example, if the focal depth of an F2.5 f-9 mm (focal length) lens being calculated with diffusion circle (image circle) of 0.01 mm, the calculation result shows that if the lens is set at a distance of 3 meters from the camera, all the objects between 1.6 meters and infinity from the camera are in good focus. And it also shows that if the lens is set at a distance of 1 meter, all the objects between 0.8 meters and 1.6 meters from the camera are in good focus. This means that if the lens is set at one of these two positions according to the distance between the camera and the object, namely at around 1 meter on one hand for the objects within the distance between 0.8 meters and 1.6 meters, or at around 3 meters on the other hand for the objects within the distance between 1.6 meters and infinity, all the objects between 0.8 meters and infinity from the camera can be in good focus. So if the lens moves between only two focusing points, such a 2 zone AF system can cover practically all the objects.

In the case of conventional camera lenses, usually the focal length is much longer and consequently the focal depth of field is much shallower, and it is difficult to make use of such shallow focal depth of filed for only two zone focusing unless the lens focal length is extremely short or the lens speed is very slow like F11 or slower.

The distances for the near and far focusing points can be calculated and obtained with the F number (lens speed) and focal length of each digital camera lens to be used. Making use of this deep focal depth of field of digital camera lenses, the 2 zone auto-focusing system that switches the lens focusing point between only two points, namely near to far or far to near, can be designed having all the objects between very near distance like 0.8 meters and infinity in good focus.

Further more the traveling distance of the digital camera lenses for focusing is extremely short and it is less than 1 mm or so for the objects between 0.8 mm and infinity. Making use of this merit of short focusing stroke of lenses, the 2 zone AF system of this invention drives the lens directly only with the force of solenoid without any help of complicated force increasing mechanism like leverage and within the very short driving stroke of the solenoid head. The very small size and lightweight of digital still camera lenses also work advantageously for this direct lens driving by the solenoid.

In this invention, an inexpensive solenoid is used to move the lens assembly. The lens assembly body has a long hole on one side as a guide-rail-axle bearing part, which works as an axle bearing and moves sliding on the guide rail. The guide rail is fixed on the assembly base beside the image sensor part, and over the guide rail the axle bearing part of the lens assembly is placed holding the guide rail through its bearing hole, and moves sliding back and forth (up and down) on the guide rail.

On the other side of the lens assembly a small flat fork is provided as a part of the lens assembly, and a position-stabilizing pin is placed between the ends of the fork (slot). The lens assembly is supported by the guide rail and axle bearing on one side, and on the other side it is supported by the fork and the stabilizing pin. The lens assembly moves sliding on the guide rail and the position-stabilizing pin.

The whole lens assembly is pressed by a coil spring toward the image sensor and stops at the position where the lens is focused at far position. There is a small arm formed as a part of the lens assembly body on the side of guide-rail-axle bearing, and the small arm is coupled with the solenoid head. When the solenoid is excited and the head of the solenoid is pulled into the solenoid body with a very short stroke, the small arm of the lens assembly is also pulled toward the solenoid body, and stops at the same time and same position as the solenoid head. At the same time, the lens assembly moves in the same direction, namely moves away from the image sensor and stops there. The first position of the lens before moving is the far position, where the lens focus is set at far position distance like around 3 meters, and the second position of the lens after the moving is the near position, where the lens focus is set at near position distance like around 1 meter. Thus by one simple solenoid movement switches the lens focusing point between far and near points. As explained heretofore the stroke of the lens focusing is less then 1 mm, and even the small amount of the solenoid force can control such a very short stroke easily and directly without any increase of the force. The far and near focus setting distances are to be decided according to the focal length and F number of the lens in use.

From the CPU or the electronically controlled distance measuring system of the camera, the 2 zone AF system receives a signal which tells whether the object is in the near zone like between around 0.8 meters and around 1.6 meters or in far zone like between around 1.6 meters and infinity.

If the signal is for near zone, instantly the solenoid is excited and the movement of the solenoid head moves the lens with a stroke of less than 1 mm and sets the lens at near distance zone, then the CPU gives an OK signal to release the shutter. If the distance signal is for far zone, it is not necessary for the lens to move at all, because it is originally set at far distance zone, so the CPU gives an OK signal at once to release the shutter without any solenoid and lens moving.

If the home position (standing position) of the lens focusing is set at the near distance zone point, the lens assembly must be pressed by the coil spring in reverse direction, i.e. the lens assembly should be pressed away from the image sensor and set at near zone like 1 meter setting point as the home position (standing position), and only when the far distance signal is received, the solenoid is excited and the lens moves toward the image sensor and stops at the far distance zone.

Thus the 2 zone AF system does not require any image status checking in succession using the complicated mechanism with the expensive stepping motor, photo-interrupter and ring cam. The movement of the lens is just one stop, from near to far or far to near, and very instant. No continuous and time taking movement of the lens is required.

These and other objects, advantages and features of the present invention will be more fully understood and appreciated by reference to the drawings and detailed description that follows.

DETAILED DESCRIPTION OF THE INVENTION

Figure 1:
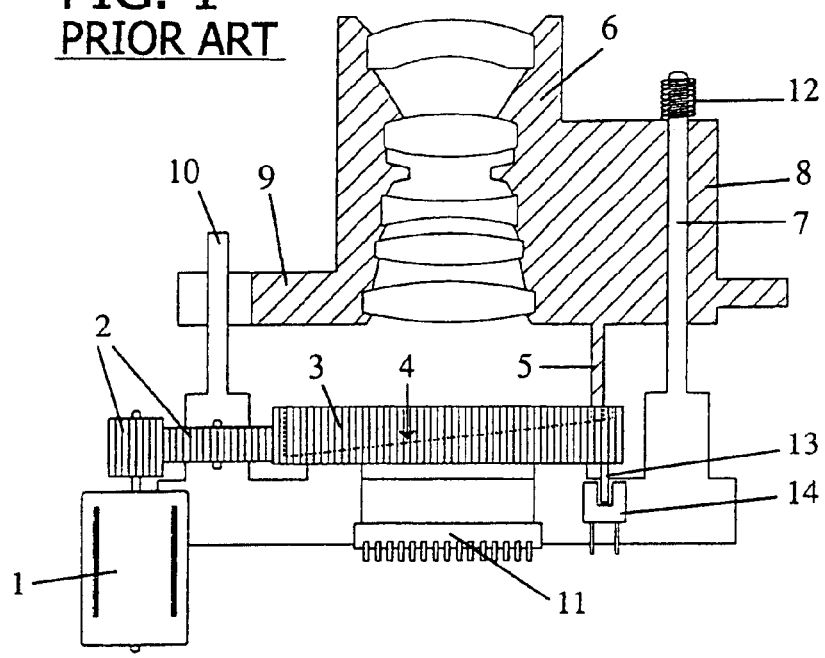
FIG. 1 is a cross sectional view of the typical auto-focusing system of digital still camera comprising of a stepping motor, a photo-interrupter and a ring cam using image-checking method in succession and lens moving method in continuous succession according to the prior art.
Figure 2:
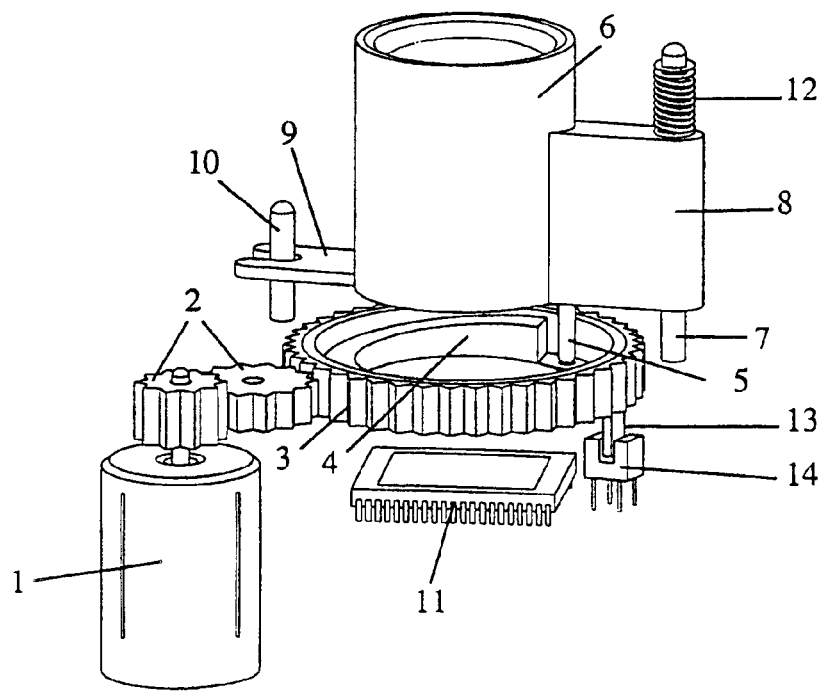
FIG. 2 is a perspective view of the typical auto-focusing system of digital still camera comprising of a stepping motor, a photo-interrupter and a ring cam using image-checking method in succession and lens moving method in continuous according to the prior art.
Figure 3:
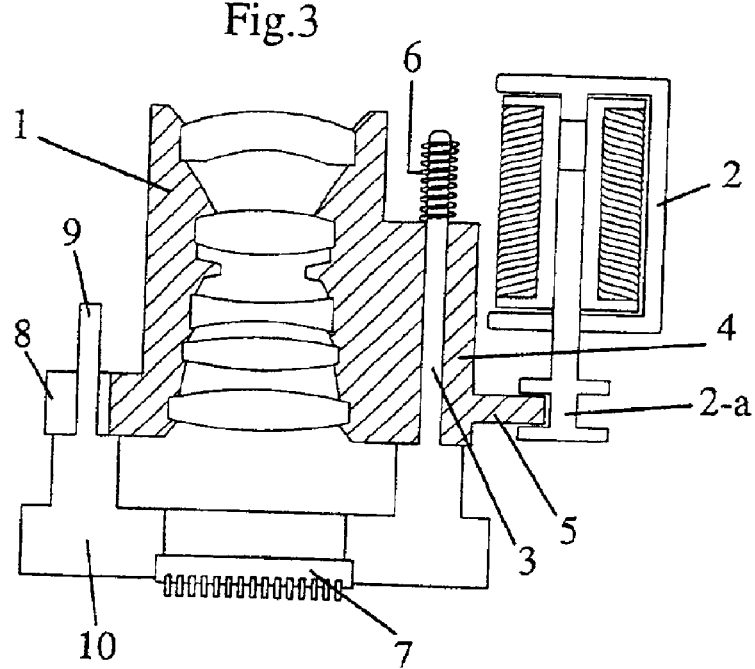
FIG. 3 is a cross sectional view of the two zone auto-focusing system of this invention, in which the lens is set in the far zone focusing position at its home position.
Figure 4:
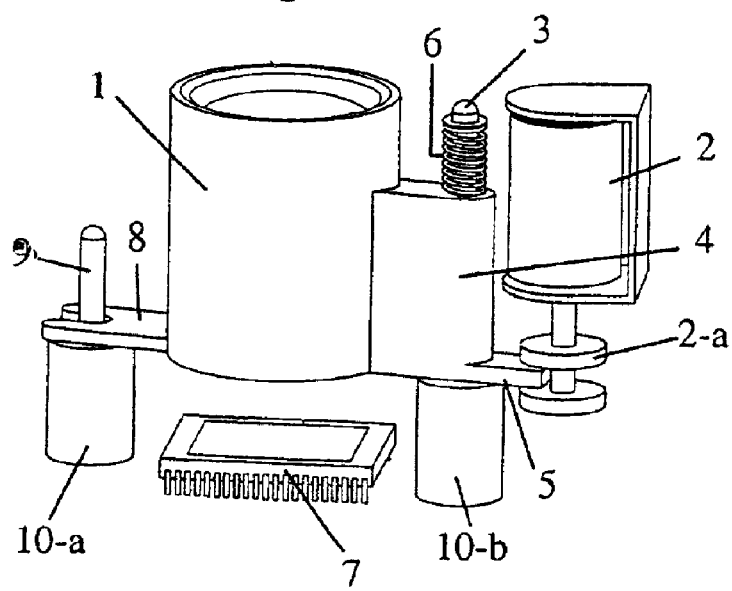
FIG. 4 is a perspective view of the two zone auto-focusing system of this invention, in which the lens is set in the far zone focusing position at its home position.

FIGS. 3 & 4 show the two zone auto-focusing system of this invention for digital still cameras which comprises a picture taking lens assembly (1), a solenoid (2), a guide rail (3), a guide rail axle bearing part (4) provided on the lens assembly, a coupling arm (5) which is formed on one side of the lens assembly to receive the force and movement of the solenoid, a coil spring (6) which presses the whole lens assembly toward the image sensor (7), a stabilizing fork (8) which is formed on the other side of the lens assembly and stabilizes the lens assembly position and a stabilizing pin (9) which is located between the ends (slot) of the stabilizing fork and stabilizes the lens assembly position together with the stabilizing fork. All these component parts are assembled on the assembly base (10). FIGS. 3 & 4 also show this invention in which the lens home position is set at far zone focusing position.

The lens assembly (1) is supported by the guide rail (3), which is fixed on the assembly base (10) beside the image sensor (7) and goes through the hole provided as the axle bearing part (4) on one side of the lens assembly (1) as a part of the lens assembly (1), and also by the position stabilizing fork (8) provided on the other side of the lens assembly (1) and the position-stabilizing pin (9) provided and fixed on the assembly base (10).

The lens assembly (1) moves back and forth toward the image sensor (7) along the guide rail (3) with the guide rail axle bearing part (4) sliding on the guide rail (3). The whole rail lens assembly (1) is always pressed toward the image sensor (7) by the coil spring (6) placed over the guide rail (3) so that when the solenoid (2) is not excited the lens assembly may stop at the position where the lens focus is set at the far zone focusing position.

The coupling arm (5) provided on the lower end of the axle bearing part (4) couples with the head (2-a) of the solenoid (2) with the groove provided on the solenoid head (2-a).

When the solenoid (2) is excited, the head (2-a) of the solenoid (2) is pulled into the solenoid body with a very short stroke, and the coupling arm (5) is pulled toward the solenoid (2), and consequently the whole lens assembly (1) moves forward (up) overriding the tension of the coil spring (6) with the same short stroke as that of the solenoid head, and stops there.

When the lens assembly (1) is at its home position (standing position), which is the position before movement of the lens assembly (1), the lens focusing is to be adjusted at the far position, which covers lens focusing for all the objects in far distance zone, When the lens assembly (1) is at its moved position, which is the position after the solenoid (2) has been excited and the lens assembly (1) has been moved, the lens focusing is to be adjusted at the near position, which covers lens focusing for all the objects in near distance zone.

Figure 5:
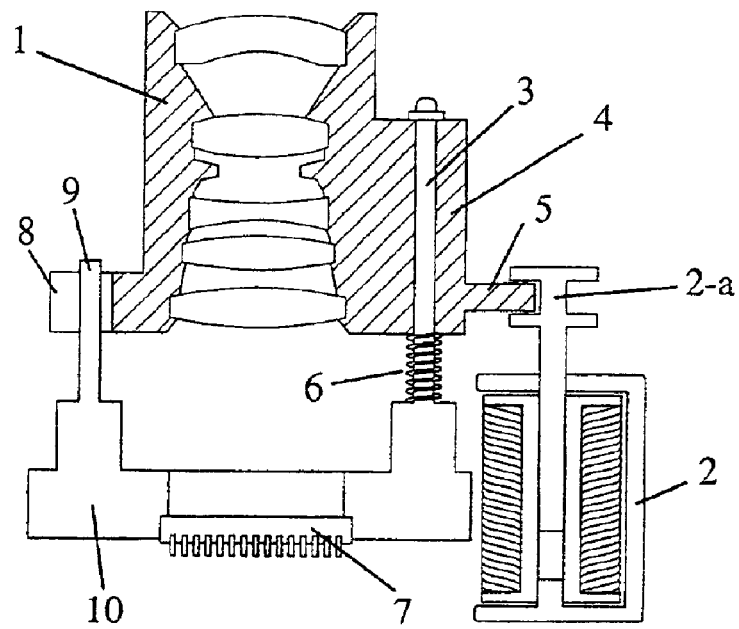
FIG. 5 is a cross sectional view of the two zone auto-focusing system of this invention, in which the lens is set in the near zone focusing position at its home position.
Figure 6:
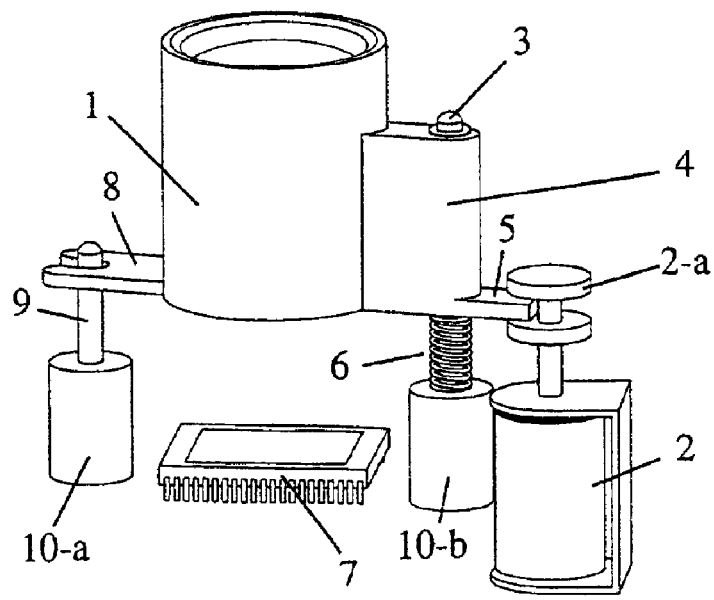
FIG. 6 is a perspective view of the two zone auto-focusing system of this invention, in which the lens is set in near zone focusing position at its home position.

FIGS. 5 & 6 show this invention in which the lens home position is set at near zone focusing position.

The lens assembly (1) is supported by the guide rail (3), which is fixed on the assembly base (10) beside the image sensor (7) and goes through the hole provided as the axle bearing part (4) on one side of the lens assembly (1) as a part of the lens assembly (1), and also by the position stabilizing fork (8) provided on the other side of the lens assembly (1) and the position-stabilizing pin (9) provided and fixed on the assembly base (10).

The lens assembly (1) moves back and forth toward the image sensor (7) along the guide rail (3) with the guide rail axle bearing part (4) sliding on the guide rail (3). The whole lens assembly (1) is always pressed away from the image sensor (7) by the coil spring (6) placed over the guide rail (3) so that when the solenoid (2) is not excited the lens assembly stops at the position where the lens focus is set at the near zone focusing position.

The coupling arm (5) provided on the lower end of the axle bearing part (4) couples with the head (2-a) of the solenoid (2) with the groove provided on the solenoid head (2-a).

When the solenoid (2) is excited, the head (2-a) of the solenoid (2) is pulled into the solenoid body with a very short stroke, and the coupling arm (5) is pulled toward the solenoid (2), and consequently the whole lens assembly (1) moves backward (down) overriding the tension of the coil spring (6) with the same short stroke as that of the solenoid head, and stops there.

When the lens assembly (1) is at its home position (standing position), which is the position before movement of the lens assembly (1), the lens focusing is to be adjusted at the near position, which covers lens focusing for all the objects in near distance zone.

When the lens assembly (1) is at its moved position, which is the position after the solenoid (2) has been excited and the lens assembly (1) has been moved, the lens focusing is to be adjusted at the far position, which covers lens focusing for all the objects in far distance zone.

Thus the 2 zone AF system works much faster than the ordinary AF system of digital cameras, because it does not require any frequent and continuous image checking with the lens moving in straight succession along the ring cam. The operation of the 2 zone AF system of this invention is very quick and simple. Only one action of solenoid attraction does everything. Also many of expensive parts and components like stepping motor, photo-interrupter and geared ring cam are not used, but just one inexpensive solenoid does the job instead.

What is claimed is:

1. A two zone auto-focusing system for digital still cameras, which can switch the lens focusing point between two positions namely far focusing position and near focusing position comprising:

an assembly base on which said two zone auto-focusing system is assembled, a solenoid which has a solenoid head and switches the focusing point of the lens between two points namely far position and near position, a picture taking lens which is assembled in a lens barrel as a lens assembly, an axle bearing part provided on one side of said lens barrel having an axle hole, a guide rail which is fixed on said assembly base and inserted into said hole of axle bearing part, a coil spring placed over said guide rail to push said lens barrel assembly toward an image sensor and hold said lens barrel assembly at the home position namely far position, a coupling arm provided on said lens assembly, said coupling arm is connected with said solenoid head so that the lens assembly is moved by the movement of the solenoid head when said solenoid is excited a stabilizing fork provided on said lens barrel, and a stabilizing pin fixed on the assembling base and placed between the ends of said fork.

2. A two zone auto-focusing system for digital still camera, which can switch the lens focusing point between two positions namely far focusing position and near focusing position comprising:

an assembly base on which said two zone auto-focusing system is assembled, a solenoid which has a solenoid head and switches the focusing point of the lens between two points namely far position and near position, a picture taking lens which is assembled in a lens barrel as a lens assembly, an axle bearing part provided on one side of said lens barrel having an axle hole, a guide rail which is fixed on said assembly base and inserted into said hole of axle bearing part, a coil spring placed over said guide rail to push said lens barrel assembly toward an image sensor and hold said lens barrel assembly at the home position namely far position, a coupling arm provided on said lens assembly, a stabilizing fork provided on said lens barrel, and a stabilizing pin fixed on the assembling base and placed between the ends of said fork, wherein said lens assembly is driven and moved away from the image sensor to place said lens assembly at the near position by the movement of said coupling arm through said head of said solenoid when said solenoid is excited receiving a signal from a CPU or electronically controlled distance measuring system of the digital still camera.

3. A two zone auto-focusing system for digital still cameras, which can switch the lens focusing point between two positions namely far focusing position and near focusing position comprising:

an assembly base on which said two zone auto-focusing system is assembled, a solenoid which has a solenoid head and switches the focusing point of the lens between two points namely far position and near position, a picture taking lens which is assembled in a lens barrel as a lens assembly, an axle bearing part provided on one side of said lens barrel having an axle hole, a guide rail which is fixed on said assembly base and inserted into said hole of axle bearing part, a coil spring placed over said guide rail to push said lens barrel assembly away from sensor an image sensor and hold said lens barrel assembly at the home position namely near position, a coupling arm provided on said lens assembly, a stabilizing fork provided on said lens barrel, and a stabilizing pin fixed on the assembling base and placed between the ends of said fork, wherein said coupling arm is connected with said solenoid head so that the lens assembly is moved by the movement of the solenoid head when said solenoid is excited.

4. A two zone auto-focusing system for digital still cameras, which can switch the lens focusing point between two positions namely far focusing position and near focusing position comprising:

an assembly base on which said two zone auto-focusing system is assembled, a solenoid which has a solenoid head and switches the focusing point of the lens between two points namely far position and near position, a picture taking lens which is assembled in a lens barrel as a lens assembly, an axle bearing part provided on one side of said lens barrel having an axle hole, a guide rail which is fixed on said assembly base and inserted into said hole of axle bearing part, a coil spring placed over said guide rail to push said lens barrel assembly away from sensor an image sensor and hold said lens barrel assembly at the home position namely near position, a coupling arm provided on said lens assembly, a stabilizing fork provided on said lens barrel, and a stabilizing pin fixed on the assembling base and placed between the ends of said fork, wherein said lens assembly is driven and moved toward the image sensor to place said lens assembly at the far position by the movement of said coupling arm through said head of said solenoid when said solenoid is excited receiving a signal from a CPU or electronically controlled distance measuring system of the digital still camera.

\* \* \* \* \*